(12) United States Patent
Goto

(10) Patent No.: US 7,693,024 B2
(45) Date of Patent: Apr. 6, 2010

(54) RECORDING/REPRODUCING METHOD AND DISC

(75) Inventor: Kenji Goto, Kanagawa (JP)

(73) Assignee: Sony Corporation (JP)

( * ) Notice: Subject to any disclaimer, the term of this patent is extended or adjusted under 35 U.S.C. 154(b) by 1030 days.

(21) Appl. No.: 11/399,217

(22) Filed: Apr. 6, 2006

(65) Prior Publication Data

US 2006/0239156 A1 Oct. 26, 2006

(30) Foreign Application Priority Data

Apr. 25, 2005 (JP) ............................. 2005-126842

(51) Int. Cl.
*G11B 20/12* (2006.01)
*G11B 7/00* (2006.01)

(52) U.S. Cl. .............. 369/59.25; 369/30.04; 369/30.02; 369/47.22

(58) Field of Classification Search .............. 369/47.14, 369/53.15–53.22, 53.31, 30.04, 30.07, 30.1, 369/30.37, 59.25, 47.17, 47.22
See application file for complete search history.

(56) References Cited

U.S. PATENT DOCUMENTS

| | | | | | |
|---|---|---|---|---|---|
| 5,068,842 | A | * | 11/1991 | Naito | 369/30.07 |
| 5,532,992 | A | * | 7/1996 | Funamoto | 369/47.14 |
| 6,771,574 | B2 | | 8/2004 | Fujimoto et al. | |
| 7,035,969 | B2 | * | 4/2006 | Yoshioka | 711/112 |
| 7,233,550 | B2 | * | 6/2007 | Park et al. | 369/47.14 |
| 7,355,934 | B2 | * | 4/2008 | Park et al. | 369/47.14 |
| 7,385,889 | B2 | * | 6/2008 | Lee et al. | 369/47.14 |
| 7,440,678 | B2 | * | 10/2008 | Haino et al. | 386/125 |
| 7,483,349 | B2 | * | 1/2009 | Park et al. | 369/47.14 |
| 2006/0140081 | A1 | * | 6/2006 | Hwang et al. | 369/47.1 |

FOREIGN PATENT DOCUMENTS

| | | |
|---|---|---|
| JP | 2003228853 | 8/2003 |
| JP | 2003233969 | 8/2003 |
| JP | 2003-346426 A | 12/2003 |
| JP | 2004-005771 A | 1/2004 |
| JP | 2004118887 | 4/2004 |

* cited by examiner

*Primary Examiner*—Thang V Tran
(74) *Attorney, Agent, or Firm*—Lerner, David, Littenberg, Krumholz & Mentlik, LLP

(57) ABSTRACT

At startup when reproduction from a recording medium such as an optical disc is started, search time for searching for management information to manage recording states of user data is shortened to reduce startup waiting time. The present invention provides a recording/reproducing method for performing recording/reproducing onto/from a recording medium having a first recording area to record user data, a second recording area to record management information to manage a recording state of the user data, and a third recording area to record non-user data other than the management information, wherein recording position information of the newest management information within the second recording area is recorded at a predetermined position in the third recording area.

6 Claims, 6 Drawing Sheets

RECORDING/REPRODUCING METHOD AND DISC

CROSS-REFERENCE TO RELATED APPLICATIONS

The present application claims priority from Japanese Patent Application No. JP2005-126842 filed on Apr. 25, 2005, the disclosure of which is hereby incorporated by reference herein.

BACKGROUND OF THE INVENTION

The present invention relates to a recording/reproducing method and a disc recording/reproducing apparatus for recording/reproducing data onto/from a recording medium capable of recording digital data.

Optical discs having large capacity such as a DVD (Digital Versatile Disc: registered trademark) and the like have been widely prevailing among recent disc recording/reproducing apparatuses.

Optical disc media (recording media) such as a DVD and the like as described above include various types, e.g., ROM (Read Only Memory) type media which are sold with contents prerecorded thereon, RW (Rewritable) type media on which data can be overwritten many times, and R (Recordable) type media into which data can be written only once.

These media each have a so-called management area existing in a preserved area on the disc, to facilitate search for data recorded internally. Recording management information to manage recording states of user data is recorded in the management area.

When a disc is inserted, an optical disc recording/reproducing apparatus first reads data (recording management information) written in the management area. The management area is thus used to read how much user data are recorded at what position on the disc, and to perform reproduction and additional writing at high speed. If there is no management area of this kind (e.g., sequential media such as tapes), no measure is provided to know where user data is written. Therefore, data have to be reproduced from the beginning of data to search for some data.

In RW type media, the management area is updated by overwriting data (management information) every time internal data are updated. However, if a recorded portion thereof does not allow writing due to a damage on the disc or due to excessive overwriting beyond an allowable number of times of overwriting (this is called a defect), recording is tried by changing the recording position.

On the other side, in R type media, overwriting is impossible due to the nature of media. Therefore, a larger management area is preserved. Every time management information is updated from the head of the area, new management information is written additionally.

In case of reproducing data recorded on media of these kinds, data fed from an optical pickup are subjected to waveform shaping by an equalization circuit and thereafter to error correction. Then, the data are stored into a buffer memory, and are sent to a host computer or video player through an external I/F.

In each of media like optical discs, the whole medium is divided into sectors each having a predetermined data quantity. Every one of the sectors is assigned at a physical address. By using these addresses, the disc area is divided into a user data recording area and the other area in accordance with purposes of use. A recording area for the aforementioned management information exists in the other area than the user data.

If the management information is broken by some factor to become unreadable, user data itself cannot be read. However, up to what position user data have been recorded can be determined by providing a circuit which detects presence or absence of an RF signal recorded on the disc face and by reproducing data from the head address of user data.

For example, Japanese Patent Application Laid-Open Publication No. 2003-228853 discloses an optical disc apparatus and a control method thereof. This apparatus records data on a DVD-R as a typical example of a writable optical disc on which data can be written only once, i.e., a so-called write-once optical disc.

SUMMARY OF THE INVENTION

In the RW type media as described above, every time user data are written additionally (or overwritten), management information thereof is updated. However, if a recorded portion of the management information becomes defective, the management information is shifted to a next position and recorded there. At this time, in order to search for management information whose recording position has been shifted many times, data in a management information recording area have to be read orderly from the head of this area until end management information recorded in the management information recording area is found. Therefore, if the recording position has been shifted n times, n times longer time than time required for reading one piece of management information is required. As the number of times n increases, required time extends. If reproduction is performed at high multiple speed, reading time can be shortened in proportion to the multiple of the speed. However, power consumption of a spindle motor in an optical disc drive increases in proportion to the multiple of reproduction speed. Therefore, the multiple speed cannot be raised so high in a mobile device.

For example, in case of using a DVD-RW, double speed is said to be suitable as reproduction speed for a mobile video camera using an optical disc. However, time required for reading all the management information recording area at the double speed is 7 to 8 seconds or so. Waiting time in the worst case is thus long.

This means that such long time is required before a disc such as a DVD-RW becomes data-writable state at startup, i.e., a serious demerit for users who use optical disc drives.

The present invention has been made in view of the situation of conventional technology as described above. It is desirable to provide a recording/reproducing method and a disc recording/reproducing apparatus capable of shortening search time for searching for management information to manage recording states of user data at startup when starting reproduction of data from a recording medium such as an optical disc to reduce startup waiting time.

According to the present invention, there is provided a recording/reproducing method for performing recording/reproducing onto/from a recording medium having a first recording area to record user data, a second recording area to record management information to manage a recording state of the user data, and a third recording area to record non-user data other than the management information, wherein recording position information of the newest management information within the second recording area is recorded at a predetermined position in the third recording area.

Also according to the present invention, there is provided a disc recording/reproducing apparatus for performing recording/reproducing onto/from a data-rewritable disc-like recording medium having a first recording area to record user data, a second recording area to record management information to manage a recording state of the user data, and a third recording area to record non-user data other than the management information, the disc recording/reproducing apparatus including: a spindle motor which drives the disc-like recording medium to rotate; an optical pickup which records/reproduces data onto/from the disc-like recording medium; a recorded/reproduced signal processing section which processes a data signal being recorded/reproduced onto/from the disc-like recording medium; and a system control circuit which controls operations of the spindle motor, optical pickup, and recorded/reproduced signal processing section, wherein the system control circuit controls recording of the newest management information onto the second recording area on the disc-like recording medium when recording of the user data ends, controls recording of newest management information recording position information indicative of a recording position of the newest management information at a predetermined position in the third recording area, controls firstly reading of the recording position information of the management information recorded at the predetermined position in the third recording area when starting reproduction from the recording medium, and controls next reading of the newest management information at a position in the second recording area which corresponds to the firstly read recording position information of the management information.

Preferably, the second recording area is a recording management area RMA, and the third recording area is a Lead-in area.

The present invention as described above performs controls as follows. The newest management information is recorded onto the second recording area on the disc-like recording medium when recording of the user data ends. Newest management information recording position information indicative of a recording position of the newest management information is recorded at a predetermined position in the third recording area. When performing reproduction from the recording medium, the recording position information of the management information recorded at the predetermined position in the third recording area is read first. The newest management information at a position in the second recording area which corresponds to the firstly read recording position information of the management information is read next.

According to the present invention, search time for searching for management information to manage recording states of user data can be shortened at startup when starting reproduction from a recording medium such as an optical disc. Thus, waiting time at the startup can be shortened.

DETAILED DESCRIPTION

A specific embodiment to which the present invention is applied will now be described in detail below with reference to the drawings.

Figure 1:
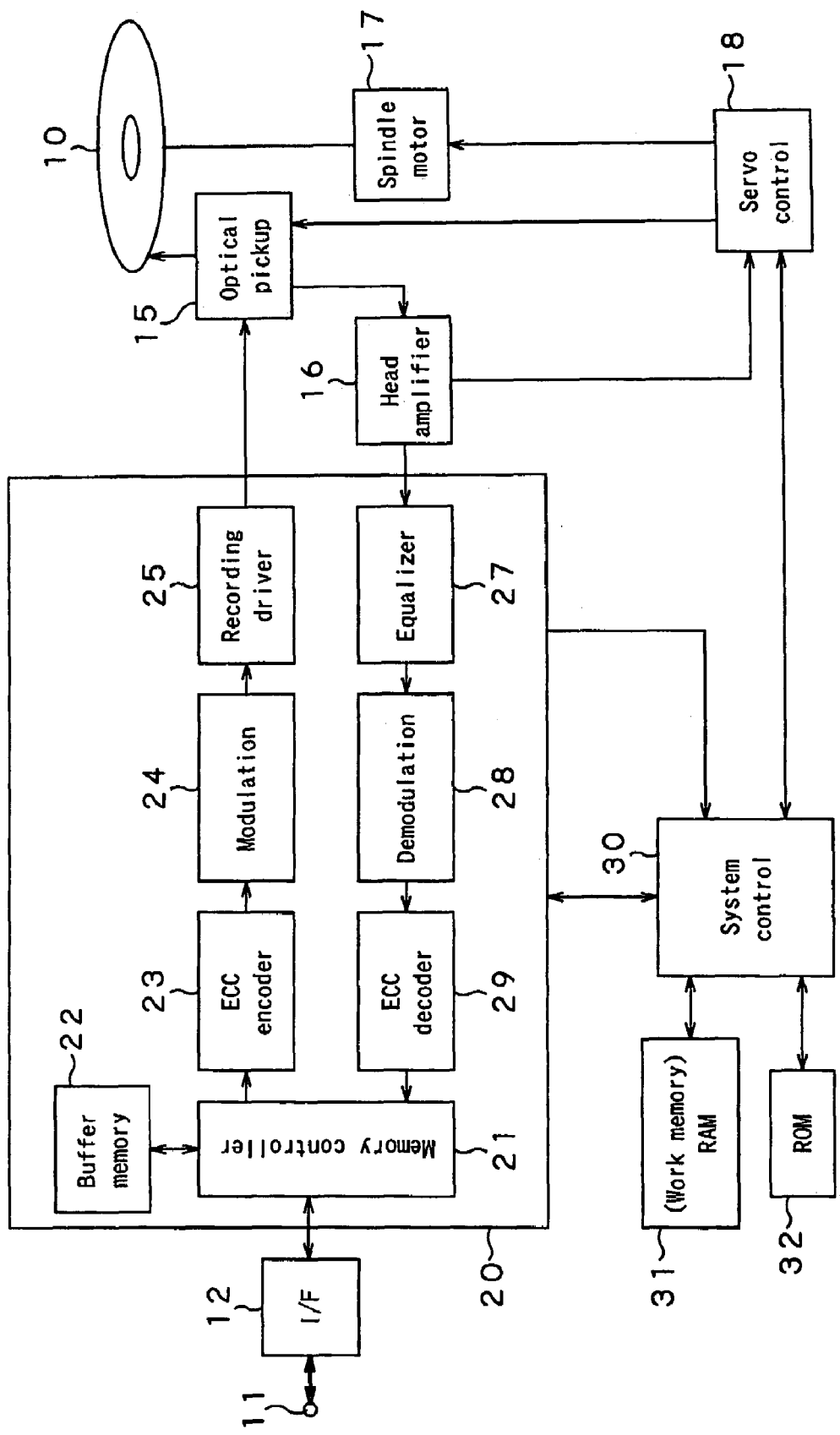
FIG. 1 is a block diagram showing schematic configuration of a disc recording/reproducing apparatus as an embodiment of the present invention.

FIG. 1 is a block diagram schematically showing an optical disc recording/reproducing apparatus used in the embodiment of the present invention. A recording medium used in the present embodiment assumes, for example, an optical disc 10 of DVD (Digital Versatile Disc: registered trademark) -RW (Rewritable) type. The recording medium is not limited to this type but various recording media can be used, e.g., optical discs of DVD-R (Recordable) type, DVD+RW type, DVD+R type, etc.

In FIG. 1, data inputted from an external host computer, video camera, or the like (not shown) through an input/output terminal 11 and an input/output interface (I/F) 12 are once stored into a buffer memory 22 through a memory controller 21 in a recording/reproducing signal processing section 20. This buffer memory 22 is provided to absorb the difference between a data transfer rate between the interface and the host computer and another data transfer rate of the disc recording/reproducing apparatus.

If the data transfer rate between the interface and the host computer is slower than the data transfer rate of the disc recording/reproducing apparatus, the disc recording/reproducing apparatus drives the disc after the buffer memory 22 is filled with the data fed to the buffer memory 22 from the input/output interface 12. The disc recording/reproducing apparatus adds ECC by an ECC encoder 23, and performs modulation suitable for recording by a modulation circuit 24. After the disc side becomes ready for recording, a signal is sent to an optical pickup 15 through a recording driver 25 for data recording, to start recording data on the optical disc 10 of the DVD-RW type, for example.

The optical disc 10 is driven to rotate by a spindle motor 17. A servo control circuit 18 performs various controls such as focusing, tracking, and threading controls of the optical pickup 15, and rotation control of the spindle motor 17. A focus error signal for the focusing control, a tracking error signal for the tracking control, and the like are sent to the servo control circuit 18 from the optical pickup 15 through a head amplifier 16. Information for the threading or track-jump control of the optical pickup 15 and information for the rotation control of the spindle motor 17 are sent to the servo control circuit 18 from a system control circuit 30 described later, to perform the controls.

While performing these controls, data is recorded onto the optical disc 10. When the buffer memory 22 becomes vacant, recording is then stopped. The apparatus further waits until the buffer memory 22 is filled up again by data sent from the host computer or the like. Recording is then started again.

Inversely, if the data transfer rate of the disc recording/reproducing apparatus is relatively slower, data transfer from the host computer is postponed. This postponement does not normally occur but likely happens in case of a computer-peripheral disc apparatus or the like.

Next, in case of reproducing data, data read from an optical disc by the optical pickup 15 are sent through the head amplifier 16 to an equalizer (equalization circuit) 27 in a recording/reproducing signal processing section 20 where waveform shaping is carried out. Thereafter, the data are demodulated by a demodulation circuit 28, and subjected to error correction by an ECC decoder 29. The data are then stored into the buffer memory 22 through the memory control circuit 21. The data stored in the buffer memory 22 are outputted from the memory control circuit 21 of the recording/reproducing signal processing section 20, and sent to the external host computer, video player, or the like (not shown) through the input/output interface 12 and the input/output terminal 11.

These operations of the recording/reproducing signal processing section 20 and servo control circuit 18 are controlled by a system control circuit 30. The system control circuit 30 is connected to a RAM 31, a ROM 32, and the like. The RAM 31 is used as a work memory, and the ROM 32 stores programs, data, and the like. As will be described later, when recording or reproducing is carried out, the system control circuit 30 controls operations of respective circuit sections of the recording/reproducing signal processing section 20 in accordance with external control information and clock information, address information, and the like which are read from the optical disc 10. The system control circuit 30 also sends rotation control information to the servo control circuit 18 to drive and control disc rotation. The system control circuit 30 also performs a control to move the optical pickup 15 to a target address position on the optical disc 10.

The entire of the recording medium such as a optical disc 10 is divided into sectors each having a predetermined data quantity. Every one of the sectors is assigned at a physical address number. By using these addresses, the disc area is divided into a first recording area for recording user data and the other area for recording the other data than the user data, in accordance with purposes of use. The mentioned other area than the area for user data is also called a preserved area, and includes second and third recording areas. The second recording area is for recording management information to manage recording states of user data as described above. The third recording area is for recording non-user data other than the management information.

Figure 2:
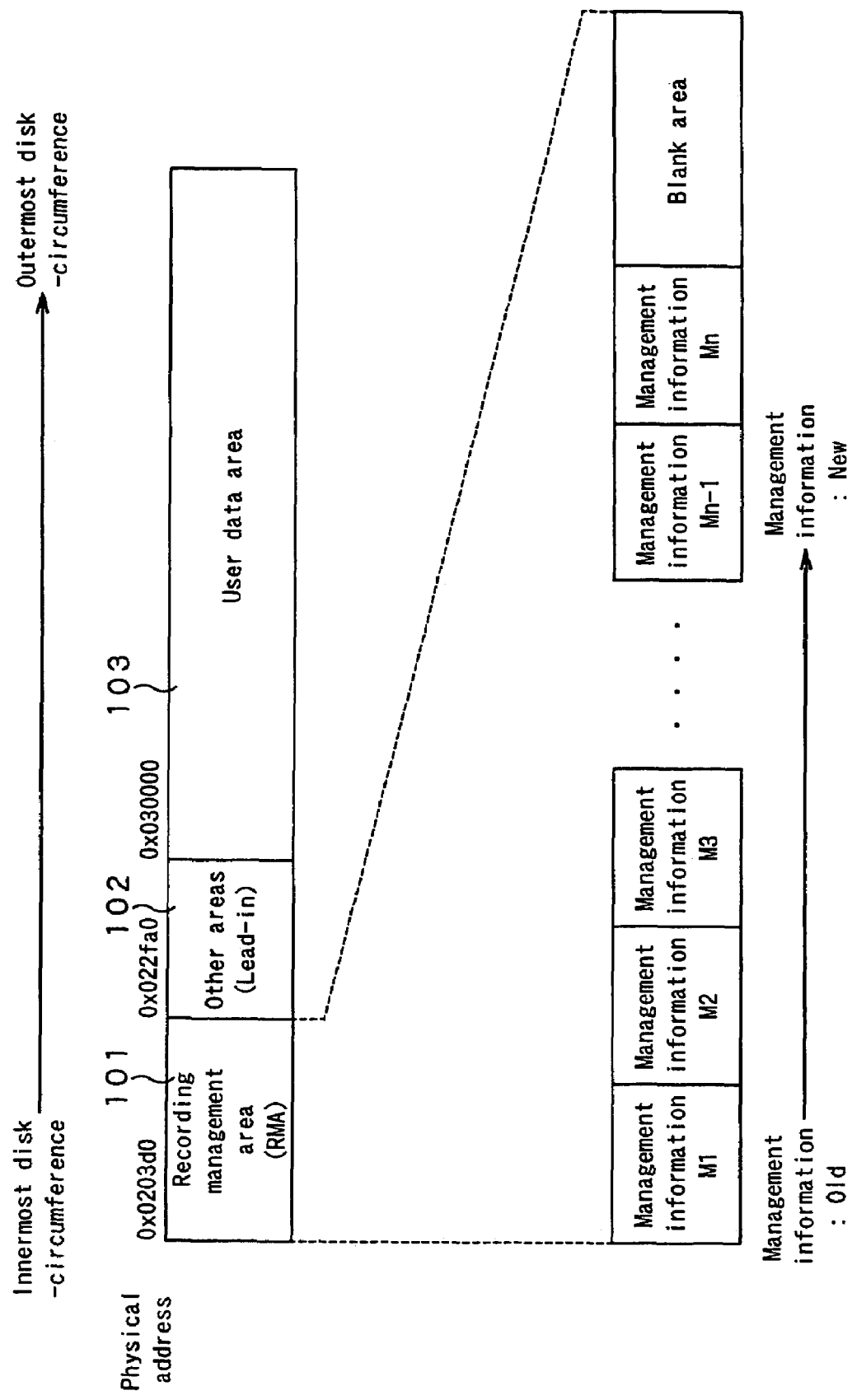
FIG. 2 is a diagram showing a configuration example of each recording area in an optical disc used in the embodiment of the present invention.

FIG. 2 shows an example of a management area in the recording medium such as an optical disc 10. In FIG. 2, at least a management information recording area (second recording area) 101, the other area (third recording area) 102, and a user data area (first recording area) 103 are provided in the mentioned order from the innermost circumference of the optical disc. Plural management information items M1 to Mn are recorded in the management information recording area 101. The management information items are, for example, data concerning:
(a) How the inside of the medium (optical disc) is partitioned?
(b) An address from which user data recording can start
(c) An address at which user data recording ends In case of an RW medium, every time user data are additionally written (or overwritten), the management information items are updated by overwriting. However, a preserved area for recording management information is kept relatively large, considering a case that a recorded portion becomes defective. If a recorded portion becomes defective, management information is recorded at a different location.

For example in FIG. 2, when use of a medium is started, "management information M1" is recorded. Every time data are added to the medium or overwritten, the contents of the "management information M1" are updated by overwriting. If the portion of the "management information M1" becomes defective, the recording position is changed to "management information M2", and recording is performed in this area. If the recording position of management information becomes defective repeatedly (n−1) times, management information is recorded at the position of "management information Mn". This kind of recording control is executed mainly by the system control circuit 30 in FIG. 1.

Conventionally, data have to be read orderly from the head of a preserved area until end management information recorded in a management information recording area is found, to search for management information whose recording position has been changed many times.

Figure 3:
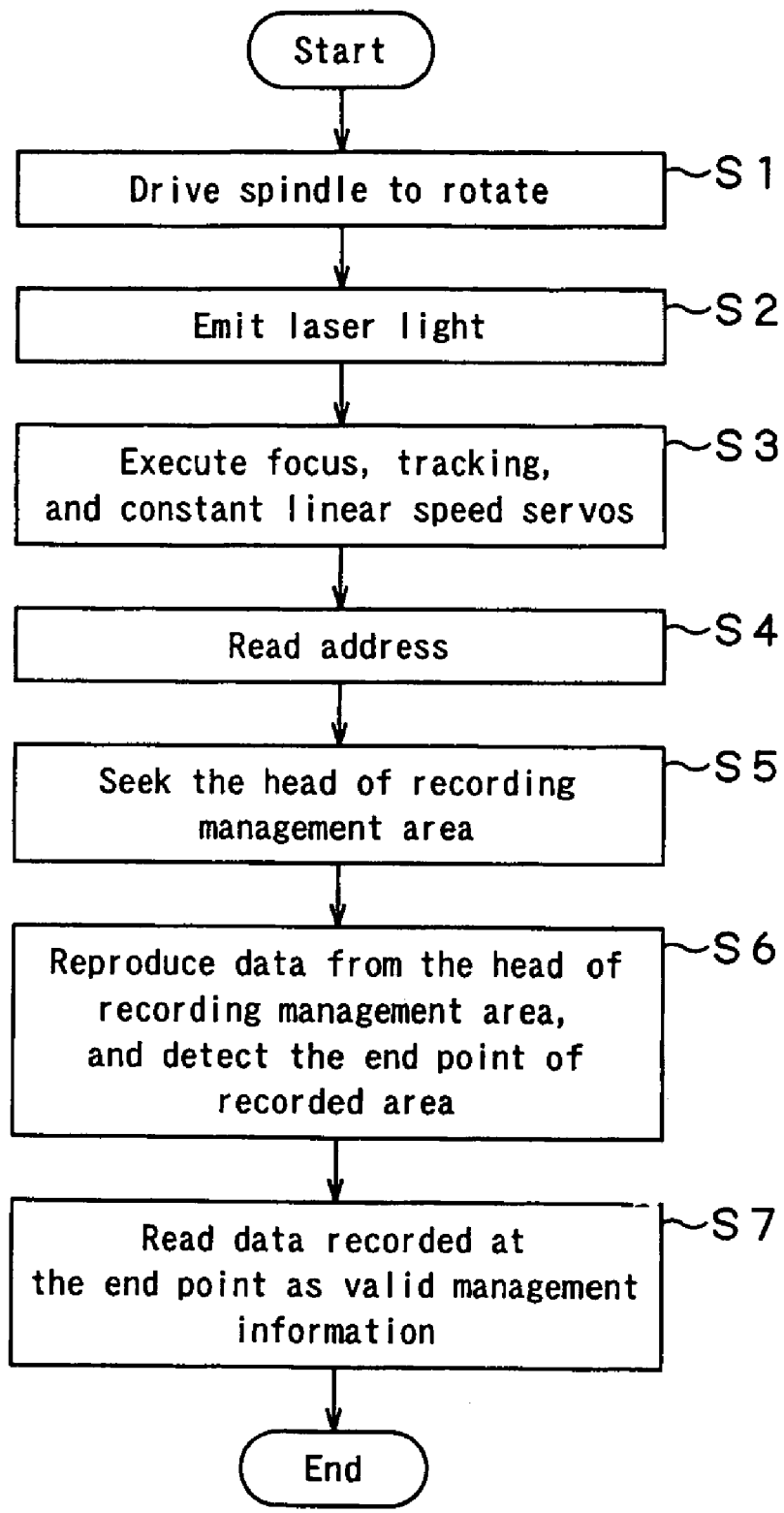
FIG. 3 is a flowchart for describing a procedure from insertion of a disc up to search for newest management information.

In this case, a processing procedure of the system control circuit and the like from insertion of a disc up to search for the newest management information can be exemplified a procedure as shown in FIG. 3. In the example of FIG. 3, a spindle is driven to rotate in step S1, and laser light emission is started to be driven in step S2. In step S3, a focus servo, a tracking servo, and a constant linear speed servo are executed. In next step S4, an address corresponding to the position of the optical pickup 15 on the optical disc 10 is read. In step S5, the head of the management information recording area where management information is written is sought. In step S6, data are reproduced from the head of the management information recording area, to detect the end point of a recorded area. In step S7, data written at the end point is read as valid management information.

In the procedure of steps S5, S6, and S7, time required for obtaining management information or particularly time required for reading sequentially data from the head of the management information recording area to the end point of the recorded area in step S6 is n times longer than time required for one management information item. Therefore, required time becomes longer as n increases. If reproduction at multiple speed is performed, reading time can be shortened in proportion to the multiple of the speed. In an optical disc drive, however, the multiple speed of a mobile device cannot be too fast because power consumption of a spindle motor increases in proportion to the multiple reproduction speed. For example, double speed is said to be suitable for a mobile video camera using an optical disc. At this double speed, seven to eight seconds or so are required to read the whole management information recording area although this seems to be long waiting time.

This means that such long time elapses before a disc such as a DVD-RW becomes data-writable state at the time of starting up an apparatus, i.e., a great demerit for users who use the optical disc drive.

Considering this demerit, the embodiment of the present invention is arranged such that information concerning the position where the newest management information is recorded (newest management information recording position information) is recorded at a predetermined location in the other area on the recording medium than the user data area. In this way, time required for reading the newest management information is shorted.

Specific examples of the embodiment of the present invention will now be described below.

When recording of management information is controlled by the system control circuit 30 or the like in the configuration shown in FIG. 1, use of a medium is started and the recording position of management information shifts from an initial recording position. At this time, management information recording position information indicative of the position (address or the like) at which the newest management information has been recorded is recorded in a vacant area in the format, in the preserved area.

In case of a DVD-RW, an example will be an initial zone other than an NBCA (Narrow Burst Cutting Area) area in the Lead-in area. However, writing something other than 00h into this area is a format violation. This area is overwritten at the time of finalization. Therefore, there is added a limitation that compatibility with other devices are lost only in a state before finalization.

The recording format of DVD-RW will now be described in particular with respect to a part relevant to recording of management information. The management information recording area in a DVD-RW is called an RMA (recording management area). This area is constructed such that 700 blocks of RMD blocks (one block: 32,768 bytes) where RMD (Recording Management Data) as units of management information are recorded are recordable. DVD-RW has recording modes, one of which is a sequential mode (Incremental recording mode and Disc at once recording mode) and the other of which is a ROW mode (Restricted Overwrite mode). In accordance with the recording modes, usage of the management information recording area RMA differs.

Figure 4:
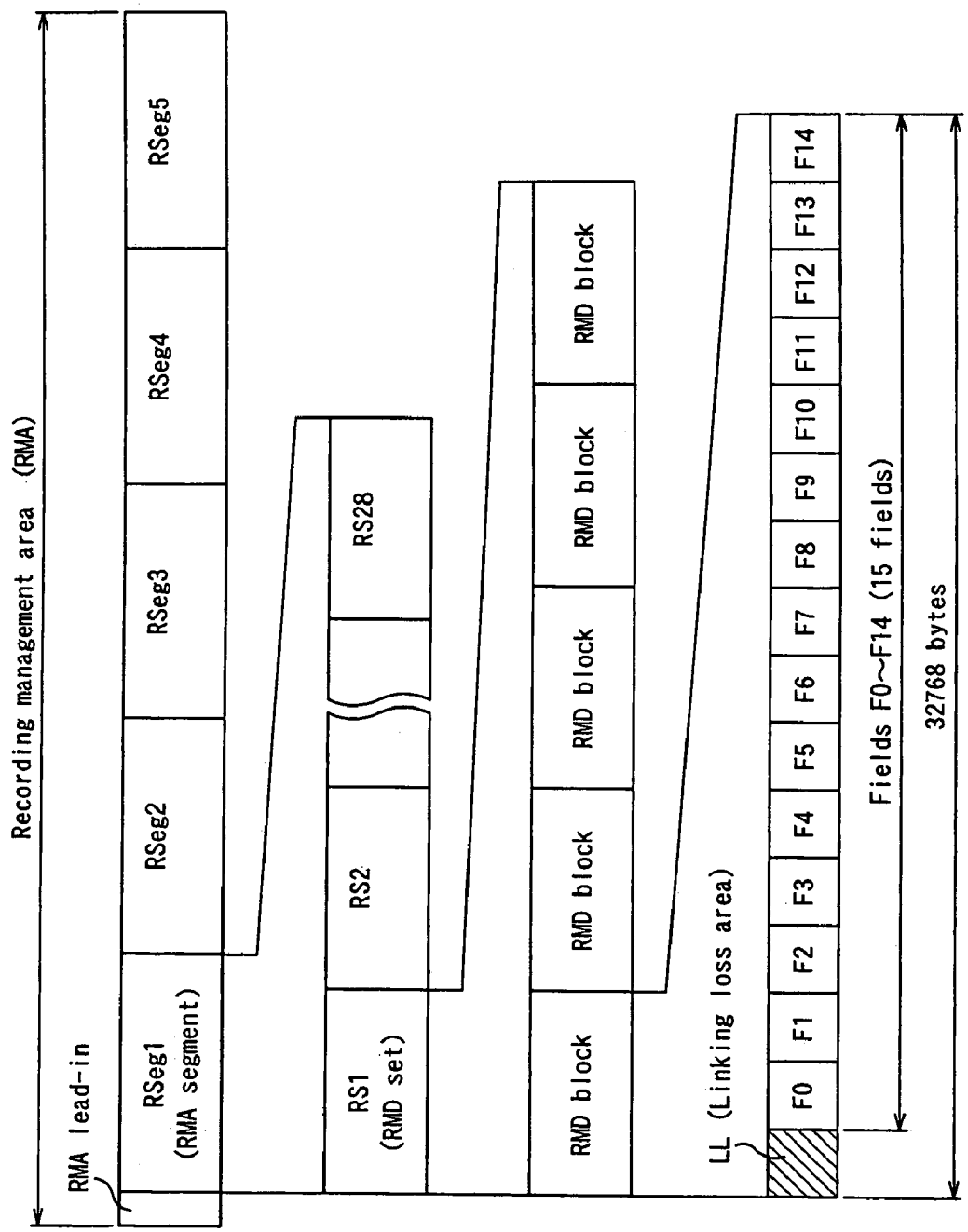
FIG. 4 is a diagram for describing specific configuration of a management information recording area RMA in a DVD-RW.

FIG. 4 shows specific configuration of the management information recording area RMA in the ROW mode. In FIG. 4, an RMA Lead-in area is provided at the head position of the management information recording area RMA. Subsequent to the RMA Lead-in area, the 700 RMD blocks are arranged in a hierarchical structure as shown in FIG. 4. That is, five RMD blocks constitute one RMD set, and 28 RMD sets RS1 to RS28 constitute one RMA segment. Five RMA segments Rseg1 to Rseg5 and the RMA Lead-in area constitute the management information recording area RMA. One RMD block has 32,768 bytes and is constituted by one linking loss area LL and 15 fields (F0 to F14). Three kinds of formats (formats 1, 2, and 3) are defined for the RMD blocks. The format 1 is used in the sequential mode, and the format 3 is used in the ROW mode. The format 2 is used in both modes. In case of the ROW mode, the first RMD set RS1 in each of five RMA segments is subjected to the format 2, and the remaining RMD sets RS2 to RS28 are subjected to the format 3. In the fields F1 in the RMD blocks of the format 2, position information of the RMD set (a pointer of the RMD set) is written. In case of the sequential mode, the RMD set immediately after the RMA Lead-in at the head of the management information recording area RMA is subjected to the format 2, and all the remaining part is used as RMD blocks in the format 1.

In case of a DVD-RW having the recording format as described above, the management information recording area 101 shown in FIG. 2 starts, as a RMA described above, from a physical address 0x0203d0. The other area starts, as a Lead-in Zone, from a physical address 0x022fa0. In the embodiment of the present invention, management information recording position information is written at a predetermined position in the Lead-in Zone starting from the physical address 0x022fa0.

A more specific example will be use of an Initial Zone assigned at physical addresses 0x202fa0 to 0x02e200 in the Lead-in Zone. This area is merely an area filled with 00h according to the standard. In the embodiment of the present invention, however, recording position information of the newest management information is recorded at a predetermined position in the initial area, as described above. As the recording position information of the newest management information, the position of the newest RMD block of the format 2 (for example, address data of eight bytes) is recorded, in case of the ROW mode. In case of the sequential mode, the newest RMD block of the format 1 (for example, address data of eight bytes) is recorded.

However, in the initial zone, NBCA (Narrow Burst Cutting Area) data for copy generation management are written optionally in some cases. The NBCA data are written in sectors assigned at physical addresses 0x023500 to 0x02bb00. Therefore, except for this range, the recording position information of the newest management information described above should preferably be recorded at a predetermined position within ranges of 0x202fa0 to 0x023500 and 0x02bb00 to 0x02e200.

Figure 5:
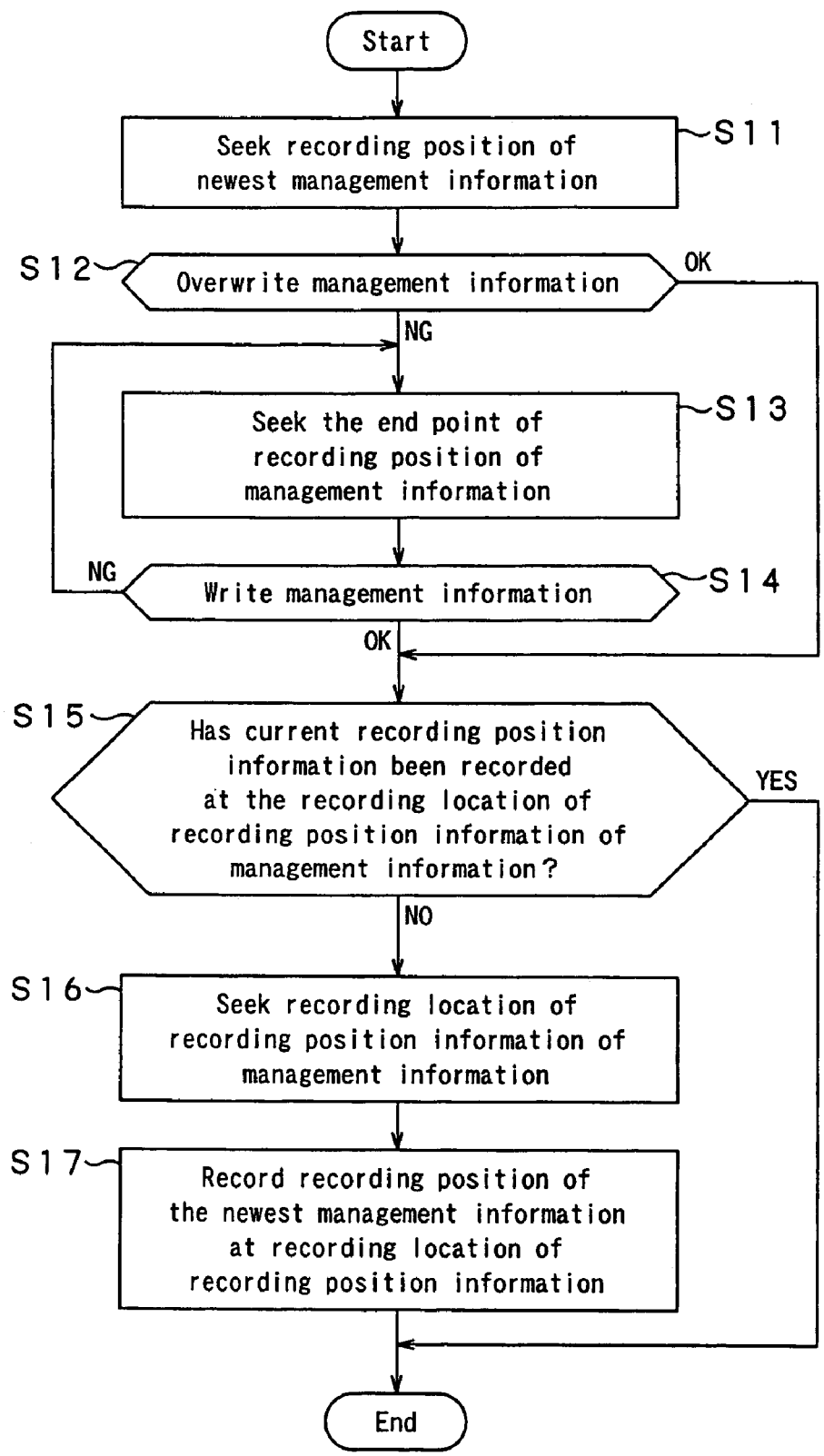
FIG. 5 is a flowchart for describing a procedure of recording operation of recording position information of the newest management information in the embodiment of the present invention.

Next, a specific example of recording operation for recording the recording position information of the newest management information according to the system control circuit 30 shown in FIG. 1 will be described with reference to the flowchart shown in FIG. 5.

In general, recording of management information is carried out when recording of user data is completed or when a disc is ejected. In case of recording the newest management information as described above, the recording position of the newest management information in the management information recording area RMA is sought in the first step S11 in FIG. 5, and overwriting of the management information is attempted in the next step S12. At this time, if the overwriting fails due to a defect or the like at the recording position (if NG), the operation goes to step S13. Otherwise, if the overwriting is completed successfully (if OK), the operation goes to step S15 which will be described later. In step S13, the end point of the recording position of the management information in the management information recording area RMA, i.e., the start position (head position) of an unrecorded area is sought. In next step S15, management information is written. If the writing is completed successfully in this step S14 (if OK), the operation goes to step S15. Otherwise, if the writing fails (if NG), the operation returns to step S13. In step S15, whether or not the current recording position information of the newest management information has been recorded at a recording location of recording position information of the newest management information which is set within an initial zone as described previously is determined. Instep S12 described above, if overwriting of the newest management information is completed successfully (OK), the recording position of the newest management information has not changed. Therefore, YES is determined in step S15, and the processing ends. Otherwise, if overwriting of the newest management information fails in step S12 (NG), the recording position of the newest management information changes. Therefore, NO is determined in step S15, and the processing goes to step S16. In step S16, the recording location of the recording position information of the newest management information set in an initial zone as described above or the like is sought. In next step S17, information of the recording position of the newest management information is recorded at the recording location of the recording position information of the management information.

Figure 6:
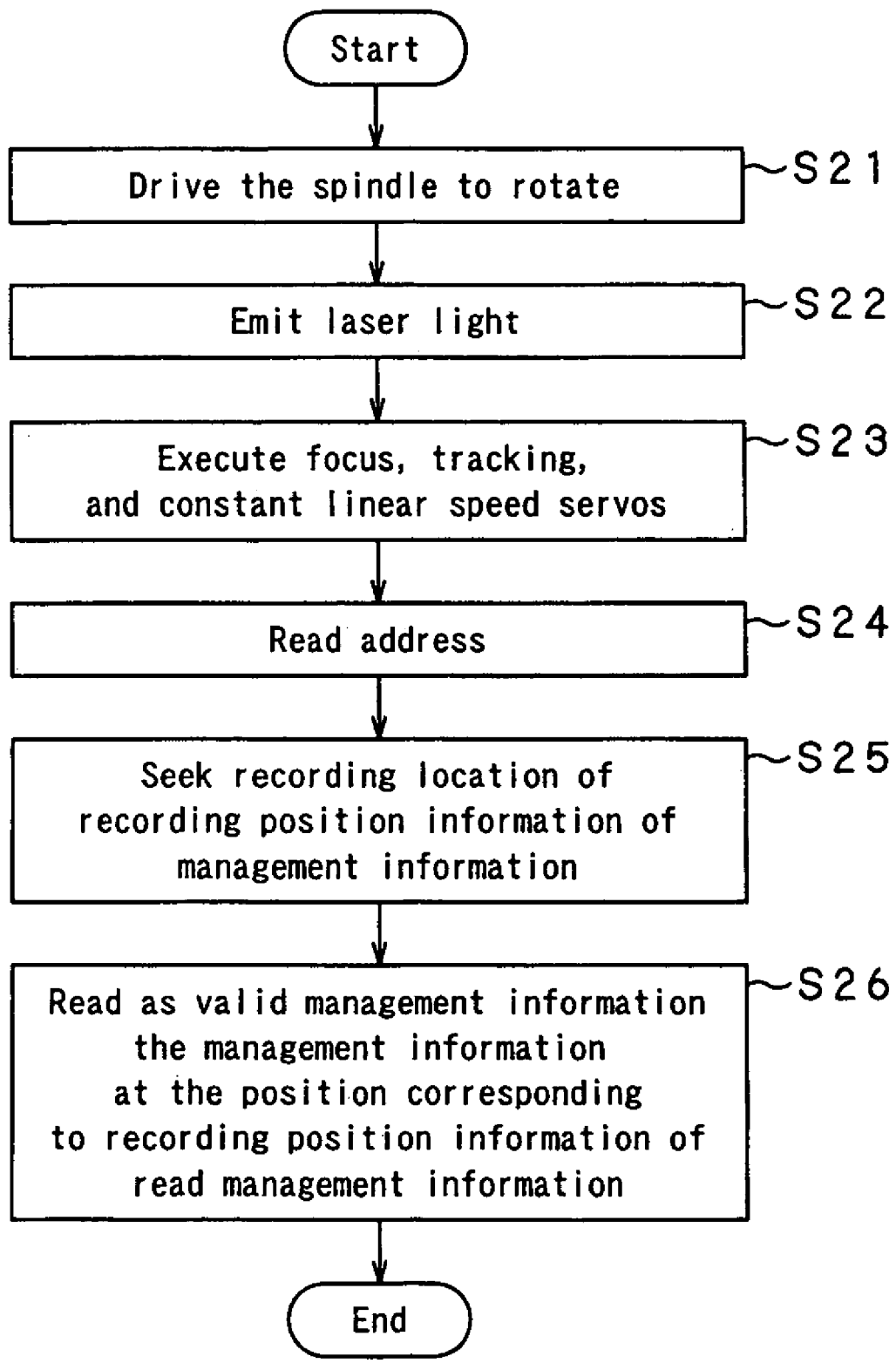
FIG. 6 is a flowchart for describing a procedure from insertion of a disc up to search for the newest management information in the embodiment of the present invention.

Next, operation from insertion of a disc up to search for the newest management information in the embodiment of the present invention will be described with reference to the flowchart shown in FIG. 6. This operation is also controlled by the system control circuit 30 shown in FIG. 1 and the like.

A disc is inserted into a recording/reproducing apparatus. Then, a spindle is driven to rotate in step S21. In step S22, driving of laser light emission is started. In step S23, a focusing servo, a tracking servo, and a constant linear speed servo are executed. In next step S24, an address corresponding to the position of the optical pickup 15 on the optical disc 10 shown in FIG. 1 is read. In step S25, the recording location of the recording position information of the management information is sought. This means that the optical pickup 15 is moved to the recording location of the recording position information of the newest management information, which has been set in advance in an initial zone as described above, and data are read. In a next step S26, the optical pickup 15 is moved to a position on the disc corresponding to the read recording position information of the newest management information, and the management information is read and is used as the valid newest management information.

Next, startup time corresponding to the operation from disc insertion up to search for the newest management information will be described, comparing conventional technology and the embodiment of the present invention.

In case of a DVD-RW as described above, data read time for the size of one ECC block (equivalent to one RMD block) at double speed is defined to be 11.8 ms according to written standards, and average seek time for one seek action is 100 ms. At this speed, the worst case of searching for management information in the sequential mode (Incremental recording mode and Disc at once recording mode) is supposed, i.e., time required for reading the all 700 ECC blocks in the management information recording area RMA is supposed. Where the 700 ECC blocks are read after performing seeking first, the following is obtained:

$$100(ms)+700\times 11.8(ms)=8.36(s)$$

This worst case may occur very rarely. However, if management information is recorded on about half of the ECC blocks in the management information recording area RMA, startup time becomes as long as about 4 seconds or more.

In contrast, according to the embodiment of the present invention, the location where the recording position information of management information has been written can be sought first and the newest management information position can be read. Time required for obtaining the recording position of the newest management information is (100+11.8) ms. Time required for reading management information corresponding to the read recording position is:

$$100+11.8+(100+11.8)\times 2=335.4(ms)$$

Therefore, startup time in case of the sequential mode is only 0.3354 seconds according to the embodiment of the present invent ion while conventional technology requires eight seconds at the worst or four seconds or so in some cases.

In case where search for management information is carried out in the ROW mode (Restricted Over Write mode), the embodiment of the present invention requires 0.3354 seconds while the conventional technology requires about three times longer startup time as follows. That is, in the ROW mode according to the conventional technology, five RMD blocks are first read from the head RMD set RS1 in each of five existing RMA segments. Among the five RMD blocks, the block whose update counter (0 to 3 bytes in the field F1 of the RMD block having the format 2) has the highest value is selected, and a RMA segment is determined. A RMD set indicated by a set pointer of the RMD block having the format 3, which is described as 4 to 7 bytes in the field F1 of the RMD block having the format 2, is read, and then, reading of the management information is completed. This kind of conventional processing in the ROW mode requires time of:

$$(100+5\times 11.8)\times 5+(100+5\times 11.8)=954(ms)$$

Compared with this time, the foregoing startup time (335.4 ms) according to the embodiment of the present invention is about ⅓.

Meanwhile, in case of a DVD-RW, for example, writing something other than 00h into the Lead-in area is a format violation from the viewpoint of standards. In order to maintain compatibility with other devices that do not have a configuration as shown in the embodiment of the present invention, a so-called finalization processing should preferably be executed. This finalization processing is performed mainly by overwriting 00h into the Lead-in area, for example, in a procedure as follows.

That is, if the finalization processing is performed and if a limitation to a Border Out start address (of limiting the address to 0x3ff00 or higher) is not satisfied during execution of a constant linear speed servo, sectors from the end of a user-data-recorded area up to the address 0x3ff00 are filled with zero data. Next, management information (Border-Out, Lead-Out) is recorded at the end of the recorded area in the user data. Next, a Lead-in area is overwritten with the newest information. At this time, a portion storing information indicative of a location where the management information has been recorded is filled with 00h, to avoid a format violation.

According to the embodiment of the present invention as described above, for example, search time for searching for management information, which requires seven to eight seconds or so at the worst according to the conventional technology in case of reproduction at double speed from a DVD-RW medium can be shortened to about 0.3 seconds or so. Therefore, startup time can be shortened even in a drive whose reproduction speed cannot conventionally be raised for the purposes of reductions in power consumption and size.

The present invention is not limited to the embodiment described above but various modifications would naturally be available without deviating from the scope of the invention. For example, recording media are not limited to DVD-RW. The present invention is applicable also to recordable optical discs such as DVD+RW, DVD-R, DVD+R, DVD-RAM, CD-R, and CD-RW and to further other recording media. Of course, the second area is not limited to the management information recording area RMA, and the third recording area is not limited to a Lead-in area.

It should be understood by those skilled in the art that various modifications, combinations, sub-combinations and alterations may occur depending on design requirements and other factors insofar as they are within the scope of the appended claims or the equivalents thereof.

The invention claimed is:

1. An optical recording medium for use with a recording/reproducing apparatus for performing recording/reproducing onto/from said recording medium, said recording medium comprising a first recording area to record user data, a second recording area to record management information to manage a recording state of the user data, and a third recording area to record non-user data other than the management information, wherein the first recording area, the second recording area, and third first recording area are arranged on the recording medium from an innermost circumference of the recording medium in the following order the second recording area, the third recording area, and the first recording area, and wherein recording position information of a newest management information within the second recording area is recorded at a predetermined position in the third recording area.

2. The recording medium according to claim 1, wherein the second recording area is a recording management area RMA, and the third recording area is a Lead-in area.

3. The recording medium according to claim 2, wherein the recording position information of the management information is recorded at a predetermined position in the Lead-in area other than a recording area of copy generation management information.

4. A disc recording/reproducing apparatus for performing recording/reproducing onto/from a data-rewritable disc-like recording medium having a first recording area to record user data, a second recording area to record management information to manage a recording state of the user data, and a third recording area to record non-user data other than the management information, the disc recording/reproducing apparatus comprising:
- a spindle motor which drives the disc-like recording medium to rotate;
- an optical pickup which records/reproduces data onto/from the disc-like recording medium;
- a recorded/reproduced signal processing section which processes a data signal being recorded/reproduced onto/from the disc-like recording medium; and
- a system control circuit which controls operations of the spindle motor, optical pickup, and recorded/reproduced signal processing section,
- wherein the system control circuit controls recording of a newest management information onto the second recording area on the disc-like recording medium when recording of the user data ends, controls recording of newest management information recording position information indicative of a recording position of the newest management information at a predetermined position in the third recording area, controls firstly reading of the recording position information of the management information recorded at the predetermined position in the third recording area when starting reproduction from the recording medium, and controls next reading of the newest management information at a position in the second recording area which corresponds to the firstly read recording position information of the management information, and
- wherein the first recording area, the second recording area, and third first recording area are arranged on the disc-like recording medium from an innermost circumference of the disc-like recording medium in the following order the second recording area, the third recording area, and the first recording area.

5. The disc recording/reproducing apparatus according to claim 4, wherein the second recording area is a recording management area RMA, and the third recording area is a Lead-in area.

6. A method for reproducing data from a recording medium in which the recording medium has a first recording area, a second recording area, and a third recording area, said method comprising:
- reading first recording position information of management information recorded at a predetermined position in the third recording area of the recording medium; and
- reading next a newest management information at a position in the second recording area which corresponds to the read recording position information of the management information,
- wherein the first recording area, the second recording area, and third first recording area are arranged on the recording medium from an innermost circumference of the recording medium in the following order the second recording area, the third recording area, and the first recording area, and
- wherein the first recording area has user data, the second recording area has management information to manage a recording state of the user data, and the third recording area has non-user data other than the management information.

* * * * *